(12) United States Patent
Miyazaki et al.

(10) Patent No.: US 7,770,009 B2
(45) Date of Patent: *Aug. 3, 2010

(54) DIGITAL SIGNING METHOD

(75) Inventors: Kunihiko Miyazaki, Yokohama (JP); Ryoichi Sasaki, Fujisawa (JP); Kazuo Takaragi, Ebina (JP); Seiichi Susaki, Yokohama (JP); Toshiyuki Moritsu, Yokohama (JP); Mizuhiro Sakai, Omiya (JP); Mitsuru Iwamura, Tokyo (JP); Tsutomu Matsumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/999,373

(22) Filed: Dec. 4, 2007

(65) Prior Publication Data

US 2008/0098232 A1    Apr. 24, 2008

Related U.S. Application Data

(63) Continuation of application No. 09/693,713, filed on Oct. 19, 2000, now Pat. No. 7,305,558.

(30) Foreign Application Priority Data

Oct. 22, 1999 (JP) ............................... P11-301216
Mar. 17, 2000 (JP) ........................... P2000-081712

(51) Int. Cl.
*H04L 9/32* (2006.01)

(52) U.S. Cl. ....................................................... 713/170
(58) Field of Classification Search ........................ None
See application file for complete search history.

(56) References Cited

U.S. PATENT DOCUMENTS 5,136,646 A    8/1992   Haber et al.
5,659,616 A    8/1997   Sudia (Continued)

FOREIGN PATENT DOCUMENTS

JP    11039219 A    2/1999

(Continued)

OTHER PUBLICATIONS

Buldas et al., "Optimally Efficient Accountable Time-Stampi," from *Lecture Notes in Computer Science*, chapter 1, Public Key Cryptology, eds. Imai & Zheng, Third International Workshop on Practice and Theory in Public Key Cryptosystems, Melbourne, Australia, Jan. 18-20, 2000, pp. 293-305.

(Continued)

*Primary Examiner*—Brandon S Hoffman
(74) *Attorney, Agent, or Firm*—Townsend and Townsend and Crew LLP

(57) ABSTRACT

According to the invention, techniques for authenticating that a digitally signed document is genuine. Specific embodiments according to the present invention can determine whether a digital signature was generated by a digital signature generator, or if the digital signature was generated by a third party posing as the digital signature generator. Specific embodiments can provide independent verification of digital signer identity based upon prior signed messages, time/date stamps, and the like. Techniques according to the present invention can be embodied in methods, apparatus, computer software and systems.

9 Claims, 12 Drawing Sheets

U.S. PATENT DOCUMENTS

| | | | |
|---|---|---|---|
| 5,956,404 A * | 9/1999 | Schneier et al. | 713/180 |
| 5,978,475 A | 11/1999 | Schneier et al. | |
| 6,397,332 B2 | 5/2002 | Kawano et al. | |
| 6,553,494 B1 | 4/2003 | Glass | |
| 7,134,021 B2 | 11/2006 | Miyazaki et al. | |

FOREIGN PATENT DOCUMENTS

| | | |
|---|---|---|
| JP | 3278721 B | 2/2002 |
| WO | 92/03000 | 2/1992 |
| WO | 94/15421 | 7/1994 |

OTHER PUBLICATIONS

Buldas et al., "Time-Stamping with Binary Linking Schemes," from *Lecture Notes in Computer Science*, chapter 14, Advances in Cryptology CRYPTO '98, eds. H. Krawczyk, 18th Annual International Cryptology Conference, Santa Barbara, California, Aug. 23-27, 1998, pp. 486-499.

* cited by examiner

FIG.7

SIGNATURE LOG TABLE 2234 — 2235

| | HASH VALUE $h(M_N)$ OF MESSAGE $M_N$ | SIGNATURE $Sign_N$ TO (PREVIOUS DATA $P_{N-1}$, MESSAGE $M_N$) | PURCHASER NAME |
|---|---|---|---|
| PREVIOUS DATA $P_{N-1}$ ($h(M_{N-1})$, $Sign_{N-1}$) | HASH VALUE $h(M_{N-1})$ OF MESSAGE $M_{N-1}$ | SIGNATURE $Sign_{N-1}$ TO (PREVIOUS DATA $P_{N-2}$, MESSAGE $M_{N-1}$) | PURCHASER NAME |
| PREVIOUS DATA $P_{N-2}$ ($h(M_{N-2})$, $Sign_{N-2}$) | ---------- | ---------- | |
| PREVIOUS DATA $P_1$ ($h(M_1)$, $Sign_1$) | HASH VALUE $h(M_2)$ OF MESSAGE $M_2$ | SIGNATURE $Sign_2$ TO (PREVIOUS DATA $P_1$, MESSAGE $M_2$) | PURCHASER NAME |
| INITIAL VALUE IV | HASH VALUE $h(M_1)$ OF MESSAGE $M_1$ | SIGNATURE $Sign_1$ TO (INITIAL VALUE IV, MESSAGE $M_1$) | PURCHASER NAME |

FIG.12

SIGNATURE LOG TABLE 2234     2235

| HASH VALUE OF MESSAGE N | SIGNATURE TO MESSAGE N | PURCHASER NAME | TIMESTAMP |
|---|---|---|---|
| HASH VALUE OF MESSAGE N-1 | SIGNATURE TO MESSAGE N-1 | PURCHASER NAME | NO ENTRY |
| ⋮ | ⋮ | ⋮ | ⋮ |
| HASH VALUE OF MESSAGE N-m | SIGNATURE TO MESSAGE N-m | PURCHASER NAME | TIMESTAMP |
| HASH VALUE OF MESSAGE N-m-1 | SIGNATURE TO MESSAGE N-m | PURCHASER NAME | NO ENTRY |
| ⋮ | ⋮ | ⋮ | ⋮ |
| HASH VALUE OF MESSAGE 2 | SIGNATURE TO MESSAGE 2 | PURCHASER NAME | NO ENTRY |
| HASH VALUE OF MESSAGE 1 | SIGNATURE TO MESSAGE 1 | PURCHASER NAME | TIMESTAMP |
| | | | |

DIGITAL SIGNING METHOD

CROSS-REFERENCES TO RELATED APPLICATIONS

The present Application is a Continuation Application of U.S. patent application Ser. No. 09/693,713, filed Oct. 19, 2000 (now issued U.S. Pat. No. 7,305,558), which relates to and claims priority from Japanese Patent Application No. P11-301216, filed Oct. 22, 1999 and Japanese Patent Application No. P2000-081712, filed Mar. 17, 2000, the disclosures of which are incorporated by reference herein in their entirety for all purposes.

BACKGROUND OF THE INVENTION

The present invention relates generally to digital signature techniques, and specifically to techniques for authenticating a digitally signed document.

Digital signature techniques add the function of the conventional seal to a digitized message such as an electronic document, and are attracting attention since the techniques make it possible to develop advanced applications of networks as seen in electronic commerce.

In conventional digital signature techniques, a digital signature generator applies a secret key that it secretly holds to a message M to be signed or to its hash value, which is a characteristic value as well as a message digest, to generate a digital signature A for the message M. Then, the message M is made public with the digital signature A attached to it. A digital signature verifier applies a public key paired with the above secret key to the digital signature A attached to the message M, and compares the result against the message M or its hash value. If they do not coincide, the message M may have been altered one way or another after the digital signature A was generated. Only when they coincide, therefore, can the verifier authenticate that the digital signature A was generated for the present message M.

However, such conventional digital signature techniques are often based upon an assumption that each digital signature generator maintains its own secret key in complete security. That is, it is assumed that the only person who can generate a digital signature which can be verified by use of a specific public key is a digital signature generator who lawfully holds a secret key paired with the public key.

What is really needed are techniques for determining whether a digital signature was generated by a digital signature generator, or if the digital signature was generated by a third party posing as the digital signature generator.

SUMMARY OF THE INVENTION

According to the invention, techniques for authenticating that a digitally signed document is genuine are provided. Specific embodiments according to the present invention can determine whether a digital signature was generated by a digital signature generator, or if the digital signature was generated by a third party posing as the digital signature generator. Specific embodiments can provide independent verification based upon prior signed messages, time/date stamps, and the like. Techniques according to the present invention can be embodied in methods, apparatus, computer software and systems.

Accordingly, in a first aspect of the present invention, on the digital signature generator side, log data of a digital-signature-attached message is registered with a log list before the digital-signature-attached message is distributed. The digital-signature-attached message includes a generated digital signature and a message. Here, the log data may be the digital-signature-attached message itself, or it may be another digital-signature-attached message created by replacing the message included in the original digital-signature-attached message with its hash value.

As used herein, the term "hash value" refers to a value computed using a function called a "hash function", which produces a fixed-length value from a variable-length input value. To ensure security, it is desirable to employ such a function with which it is difficult to find two input values that correspond to the same output value as well as to find an input value that corresponds to a given output value. In specific embodiments, the algorithm of a hash function to be used is publicly available across the entire system.

This makes it possible for a digital signature verifier to verify whether a digital-signature-attached message to be verified is distributed by a digital signature generator, by obtaining a log list from the digital signature generator and checking whether log data of the digital-signature-attached message to be verified is registered with the log list.

Further, according to a second aspect of the present invention, a digital signature generator sends a digital signature for a message that the generator itself generated, to a time stamping authority, which is a reliable third party, and asks the station to generate a signature of the time stamping authority, the signature is called the timestamp, and in a specific embodiment, can be made using the digital signature and time data with a secret key that the time stamping authority secretly holds. The digital signature generator, then, distributes the above message with this timestamp attached thereto.

Accordingly, a digital signature verifier can derive the time data and the digital signature from the timestamp attached to the message by use of a public key paired with the secret key held by the time stamping authority, and verify whether the validity of the digital signature is assured by its digital signature generator by checking whether date and time indicated by this time data exceeds the date and time given by the digital signature generator beforehand.

As used here, the term "IC card" refers to a card formed of a flexible material, for example, body that comprises a chip, or module, embedded within it. IC cards are also referred to as "smart card," "chip card" or "memory card," for various types.

Numerous benefits are achieved by way of the present invention over conventional techniques. Specific embodiments according to the present invention can determine whether a digital signature was generated by a digital signature generator, or if the digital signature was generated by a third party posing as the digital signature generator. Further, some specific embodiments can provide independent verification of digital signer identity based upon prior signed messages, time/date stamps, and the like.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 7 illustrates a diagram of representative example of data stored in a signature log table 2234 in the second embodiment of the present invention.

FIG. 12 illustrates a diagram of a representative data stored in a signature log table 2234 in a modification of the third embodiment of the present invention.

DESCRIPTION OF THE SPECIFIC EMBODIMENTS

Figure 1:
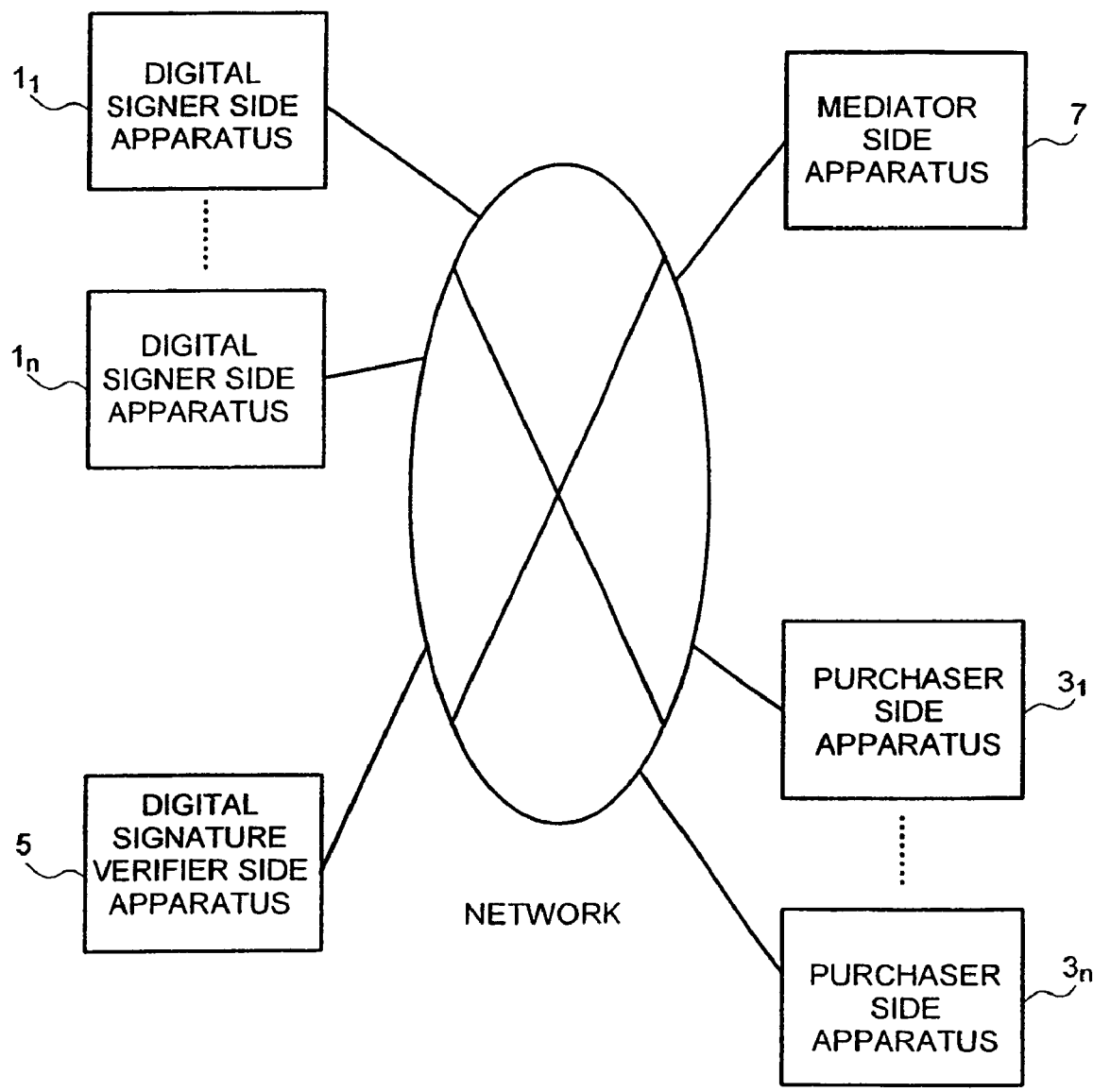
FIG. 1 illustrates a schematic diagram of a representative example system in a first embodiment of the present invention.

The present invention provides techniques for authenticating that a digitally signed document is genuine. Specific embodiments according to the present invention can determine whether a digital signature was generated by a digital signature generator, or if the digital signature was generated by a third party posing as the digital signature generator. Further, independent verification of digital signer identity based upon prior signed messages, time/date stamps, and the like, can be performed. Techniques according to the present invention can be embodied in methods, apparatus, computer software and systems.

Conventional digital signature techniques are described, for example, in the following references, Alfred J. Menezes, Paul C. van Oorshot, and Scott A. Vanstone, "Handbook of Applied Cryptography", CRC Press, Inc. 1997, Bruce Schneier, "Applied Cryptography Second Edition", John Wiley & Sons, Inc. 1996, International Application Number PCT/US91/05386, and "Standard Specifications for Public Key Cryptography (Draft Version 11)", IEEE P1363, IEEE, July 1999, the entire contents of which is incorporated herein by reference for all purposes. While important contributions to the field in their own right, opportunities for further improvement in security not heretofore known in the art can be achieved by specific embodiments according to the present invention.

Conventional digital signature techniques are often based upon an assumption that each digital signature generator secretly holds its own secret key. That is, it is assumed that the only person who can generate a digital signature which can be verified by use of a specific public key is a digital signature generator who holds a secret key paired with the public key. If a third party illegally obtains a secret key of a digital signature generator due to an error in key management on the digital signature generator side or some other reason, and generates a digital signature posing as the digital signature generator, such an illegality can not be detected by the above digital signature technique.

One technique applies a second secret key held by a digital signature generator to both a message and the digital signature for the message to newly generate a digital signature for the message. However, this technique is intended to ensure the security of the previous digital signatures generated by a digital signature generator when it has become highly possible for a third party to obtain a secret key of the digital signature generator as a result of the recent rapid increase in the computational capability of computers or improved algorithm for deriving the secret key from a public key. For a more detailed description of such techniques, further reference may be had to an International Application Number PCT/US93/1117.

One illegality prevention technique is designed to prevent a digital signature generator from generating a new digital signature by somehow altering a message that the generator generated before, and replacing the original message and the original digital signature with the new ones. Specifically, a digital signature generator applies a secret key that the generator secretly holds, to a message $M_n$ to be signed or its hash value, the hash value of the message used immediately before, and time data to generate a digital signature $A_n$ for the message $M_n$. This assures that a digital signature $A_{n+1}$ generated immediately after the digital signature $A_n$ reflects the message $M_n$. With this arrangement, if a digital signature generator adds an alteration to the message $M_n$ that the generator has generated so as to generate a new digital signature, and replaces the original message $M_n$ and the original digital signature $A_n$ with the new ones, such an illegal conduct will cause the new message and signature to fail to match the digital signature $A_{n+1}$. For a more detailed description of such techniques, further reference may be had to a publication by Bruce Schneier entitled, "Applied Cryptography Second Edition", John Wiley & Sons, Inc. 1996, and an International Application Number PCT/US91/05386, for example.

FIG. 1 is a schematic diagram of a representative example system in a first embodiment according to the present invention.

As shown in the figure, this system comprises digital signer side apparatuses $1_1$ through $1_n$ (hereinafter referred to as digital signer side apparatuses 1) for creating digital-signature-attached messages, purchaser side apparatuses $3_1$ through $3_n$ (hereinafter referred to as purchaser side apparatuses 3) for holding digital-signature-attached messages created by the digital signer side apparatuses 1, a digital signature verifier side apparatus 5 for verifying digital-signature-attached messages created by the digital signer side apparatuses 1, and a mediator side apparatus 7 for publishing lists of messages created by the digital signer side apparatuses 1, and acquiring digital-signature-attached messages from the digital signer side apparatuses 1 on behalf of the purchaser side apparatuses 3.

It should be noted that in descriptions of the embodiments of the present invention, the term "message" includes, in addition to digital data such as electronic documents, digitized multimedia data such as image data and audio data, and digital data having the same value as that of securities. Furthermore, when used in descriptions of the embodiments of the present invention, the term "purchase" refers to an action to acquire, one way or another, a digital-signature-attached message created by a digital signer, whether on free of charge or on a charge basis.

Figure 2:
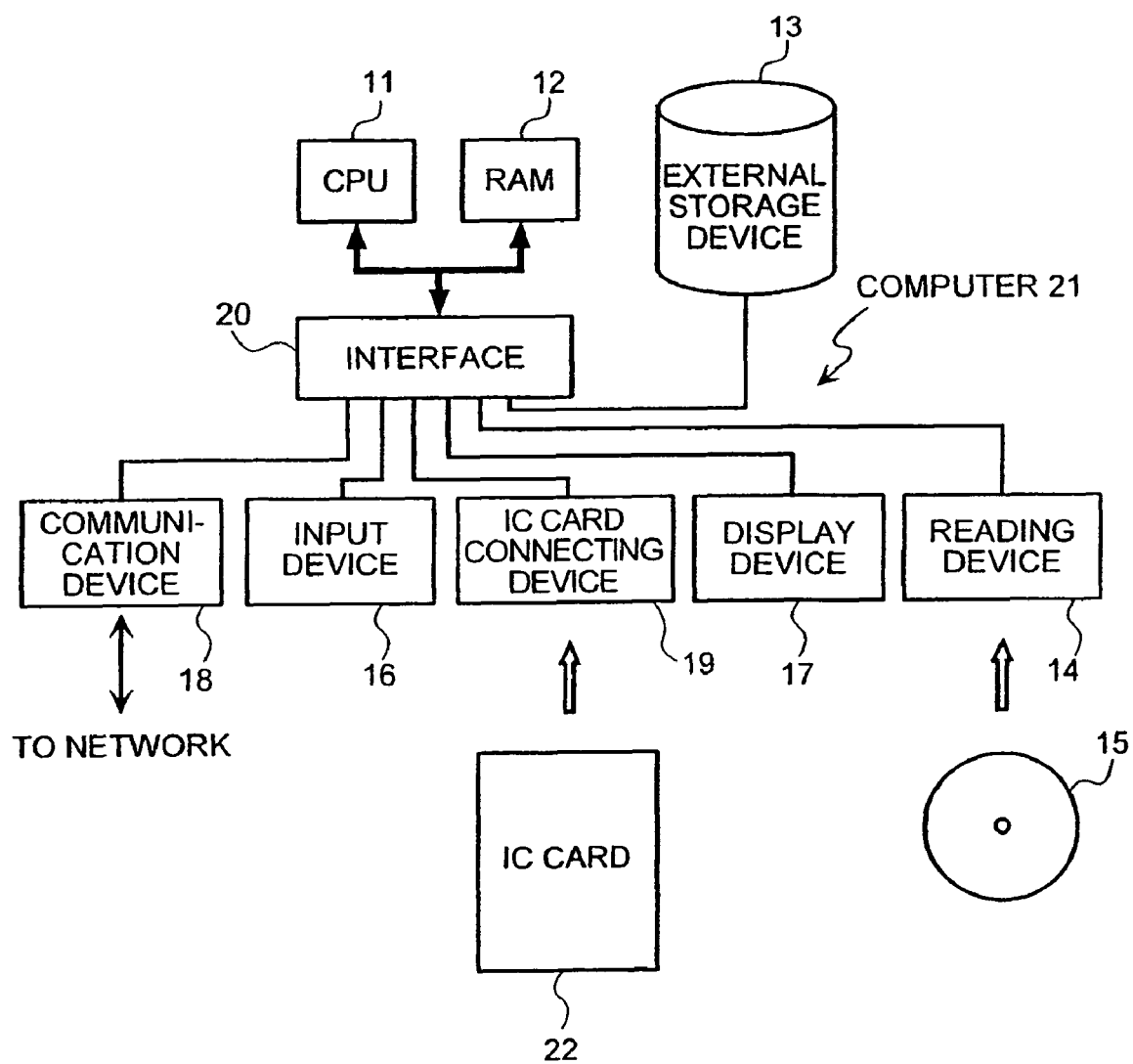
FIG. 2 illustrates a schematic diagram of a representative embodiment of a digital signer side apparatus 1, a purchaser side apparatus 3, a digital signature verifier side apparatus 5, a mediator side apparatus 7, and a timestamp issuing apparatus 8 shown in FIG. 1.

FIG. 2 is a schematic diagram of a representative example embodiment of the digital signer side apparatuses 1, the purchaser side apparatuses 3, the digital signature verifier side apparatus 5, the mediator side apparatus 7, and the timestamp issuing apparatus 8.

Each apparatus can be constructed by connecting an IC card 22 which is a storage medium having a computational function, to a computer 21 which has a general configuration comprising a CPU 11, a RAM 12 functioning as a work area for the CPU 11, an external storage device 13 such as a hard disk device, a reading device 14 for reading data from a portable storage medium 15 such as a CD-ROM and an FD, an input device 16 such as a keyboard or a mouse, a display device 17 such as a monitor, a communication device 18 for communicating with other apparatuses through a network, an IC card connecting device 19, and an interface 20 used for transmitting and receiving data between the above apparatuses.

The external storage device 13 in each digital signer side apparatus 1 stores a signature-attached message creating program 131 for causing the IC card 22 to generate a digital signature for a message and attaching the generated digital signature to the message before distributing the message as a digital-signature-attached message, and a verification requesting program 132 for causing the digital signature verifier side apparatus 5 to verify a digital-signature-attached message created by the digital signer side apparatus 1 and providing the digital signature verifier side apparatus 5 with information necessary for the digital signature verifier side apparatus 5 to verify the digital-signature-attached message, according to the instructions of the digital signature verifier side apparatus 5. These programs are loaded into the RAM 12 so that the CPU 11 executes them as processes such as a signature-attached message creation processing section 111 and a verification request processing section 112.

The external storage device 13 in each purchaser side apparatus 3 stores a signature-attached message acquiring program 331 for acquiring a digital-signature-attached message from a digital signer side apparatus 1, and a verification requesting program 332 for causing the digital signature verifier side apparatus 5 to verify the acquired digital-signature-attached message. These programs are loaded into the RAM 12 so that the CPU 11 executes them as processes such as a signature-attached message acquisition processing section 311 and a verification request processing section 312.

The external storage device 13 in the digital signature verifier side apparatus 5 stores a signature verifying program 531 for verifying a digital-signature-attached message according to the instructions of a digital signer side apparatus 1 or a purchaser side apparatus. This program is loaded into the RAM 12 so that the CPU 11 executes it as a process called a signature verification processing section 511.

The mediator side apparatus 7 acquires a digital-signature-attached message from a digital signer side apparatus 1 on behalf of a purchaser side apparatus 3. Basically, the mediator side apparatus 7 has the same configuration as that shown in FIG. 2. The IC card connecting device can be omitted from each of the purchaser side apparatuses 3, the digital signature verifier side apparatus 5, and the mediator side apparatus 7.

The above-described programs may be read from the portable storage medium 15 such as a CD-ROM or an FD by the reading device 14 and installed in the external storage device 13, or they may be downloaded from the network into the external storage device 13 through the communication device 18. The programs may be embodied in a carrier wave, which is a computer readable medium for transmitting a computer program.

Figure 3:
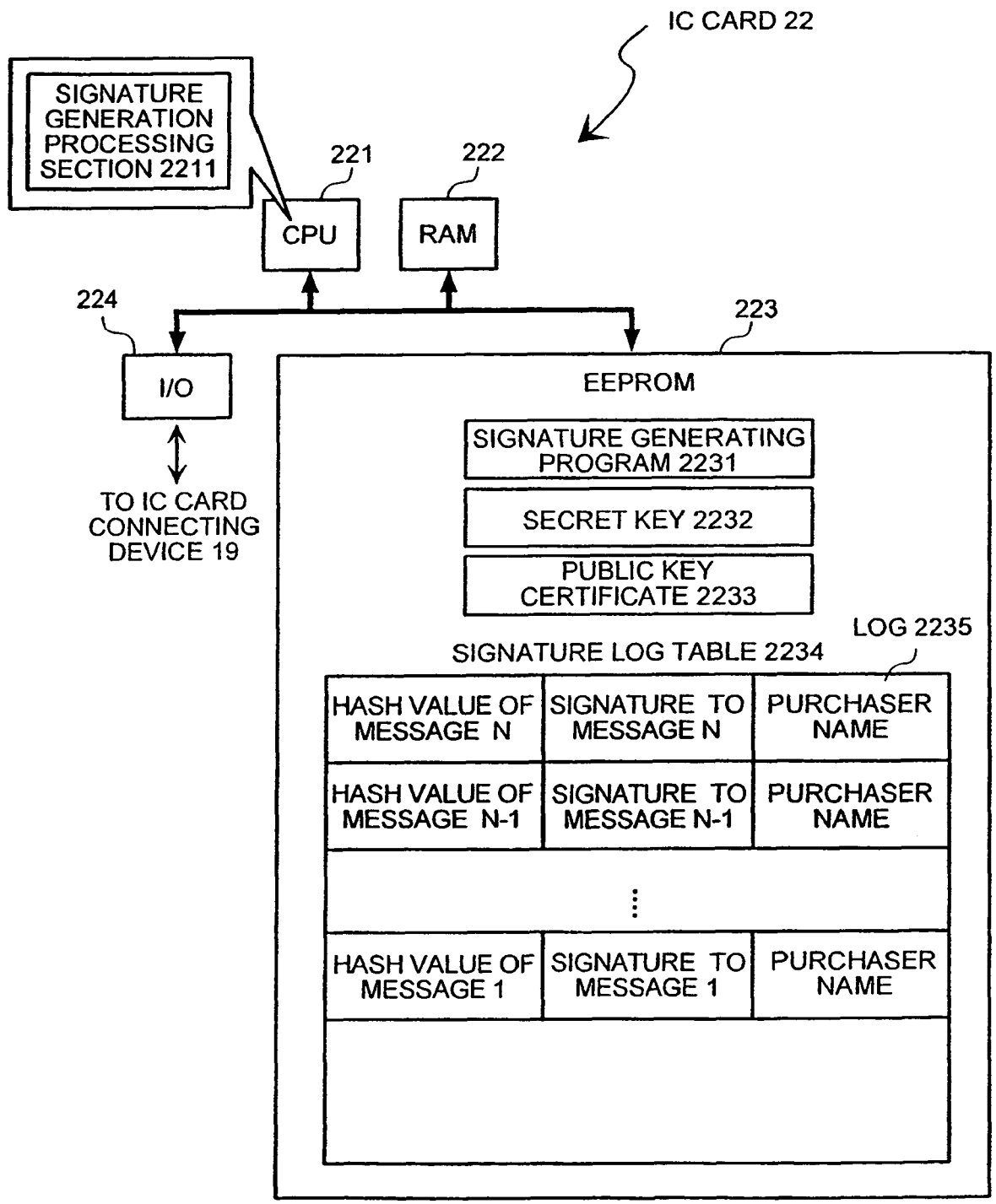
FIG. 3 illustrates a schematic diagram of a representative example embodiment of an IC card 22 shown in FIG. 2.

FIG. 3 is a schematic diagram of a representative example embodiment of the IC card 22 shown in FIG. 2.

As shown in the figure, the IC card 22 comprises a CPU 221, a RAM 222 functioning as a work area for the CPU 221, an EEPROM 223 for storing various programs and data, and an I/O 224 for communicating with the computer 21 through the IC card connecting device 19. When used in descriptions of this invention, the term "EEPROM" refers to a read-only memory whose stored data can be electronically rewritten.

The EEPROM 223 stores a signature generating program 2231 for generating a digital signature for a message according to the instructions of the signature-attached message creation processing section 111, a secret key 2232 used for generating a digital signature, a public key certificate 2233 containing a public key paired with the secret key 2232, and a signature log table 2234 for recording the history of generation of digital signatures. The signature generating program 2231 and the secret key 2232 are set when the IC card 22 is issued. They are set so that they cannot be read from outside the IC card 22. Data and programs, such as the signature generating program 2231, which are not rewritten once they have been written at the time of issuing the IC card 22, may be stored in a non-rewritable ROM instead of the EEPROM 223. The public key certificate 2233 is set when the IC card 22 is issued. It is set so that it can be read from outside the IC card 22. The signature log table 2234, on the other hand, is set so that no data is recorded in the table at the time of issuing the IC card 22, and each time the IC card 22 generates a digital signature, the table adds a signature log 2235 comprised of the generated digital signature, a hash value of a message to be signed, and the name of the purchaser (the address of a purchaser side apparatus 3 or the like) of the message to be signed. It is assumed that the signature log table 2234 is set so that its data can be read from outside the IC card 22, but cannot be rewritten or deleted from outside IC card 22. The example in FIG. 3 shows the state of the IC card 22 after the digital signature generating operation has been performed N times on the IC card 22, indicating N signature logs 2235 recorded in the signature log table 2234.

The IC card issuer may perform the issuing operation of the IC card 22, that is, an operation in which the signature generating program 2231, the secret key 2232, and the public key certificate 2233 are stored and set in the EEPROM 223. Or the IC card issuer may issue the IC card 22 in a state that the EEPROM 223 stores only the signature generating program 2231, and a digital signer that owns the IC card 22 may store and set the secret key 2232 and the public key certificate 2233 in the EEPROM 223.

When the digital signer stores and sets the secret key 2232 in the EEPROM 223, it is desirable for the digital signer to execute a secret-key generating program that is stored in the IC card 22 by the IC card issuer beforehand so that the digital signer itself does not know the value of the secret key 2232.

The CPU 221 creates a signature generation processing section 2211 as a process by loading and executing the signature generating program 2231 in the RAM 222.

Next, referring to FIG. 4, description will be made of representative example processes in specific embodiments in which a purchaser side apparatus 3 acquires a digital-signature-attached message from a digital signer side apparatus 1.

In a digital signer side apparatus 1, when the signature-attached message creation processing section 111 receives a request for transmission of a message from a purchaser side apparatus 3, the section reads the requested message from, for example, the external storage device 13 in which various messages are stored, and applies a hash function to the message to acquire its hash value. Then, the section asks the signature generation processing section 2211 to generate a signature by sending to it the hash value of the message and the address of the purchaser side apparatus 3 that has sent the transmission request (S6101). The signature generation processing section 2211 applies the secret key 2232 to the sent hash value of the message to generate a digital signature for the message (S6102). The signature generation processing section 2211 registers a signature log 2235 which is comprised of the hash value of the message, the digital signature, and the address of the purchaser side apparatus 3 that requested the transmission, with the signature log table 2234 (S6103), and sends the digital signature and the public key certificate 2233 to the signature-attached message creation processing section 111. The signature log table 2234 is preferably indexed beforehand so as to sequentially manage data in order to clarify the chronological relationships between the signature logs. The signature-attached message creation processing section 111 creates a digital-signature-attached message by attaching the above digital signature to the message whose transmission has been requested, and sends the digital-signature-attached message with the public key certificate 2233 attached thereto, to the purchaser side apparatus 3 that has requested the transmission (S6104).

In a purchaser side apparatus 3, when the purchaser has requested acquisition of a message through an input device 36, the signature-attached message acquisition processing section 311 sends a request for transmission of the message to a digital signer side apparatus 1 that holds the message (S6001), and waits for a digital-signature-attached message to be transmitted from the digital signer side apparatus 1 (S6002). The signature-attached message acquisition processing section 311 verifies the digital signature included in the received digital-signature-attached message. Specifically, the section obtains two hash values: one found by processing the digital signature with the public key of the public key certificate 2233 attached to the digital-signature-attached message, and the other computed from the message included in the digital-signature-attached message. Then, the two hash values are compared (S6003). If they coincide (the result is OK at step S6004), the signature-attached message acquisition processing section 311 authenticates that the digital signature has been generated for the message included in the digital-signature-attached message, and accepts the digital-signature-attached message and stores it in an external storage device 33 or the like after attaching the address of the digital signer side apparatus 1 from which the message was obtained, to the message (S6005). If they do not coincide (the result is NG at step S6004), the signature-attached message acquisition processing section 311 does not authenticate the digital-signature-attached message and discards it (S6006).

Before actually accepting a digital-signature-attached message, the purchaser side apparatus may ask the digital signature verifier side apparatus 5 to verify the signature as necessary to check the validity of the signature as described later, depending on, for example, the importance of the digital-signature-attached message.

Figure 4:
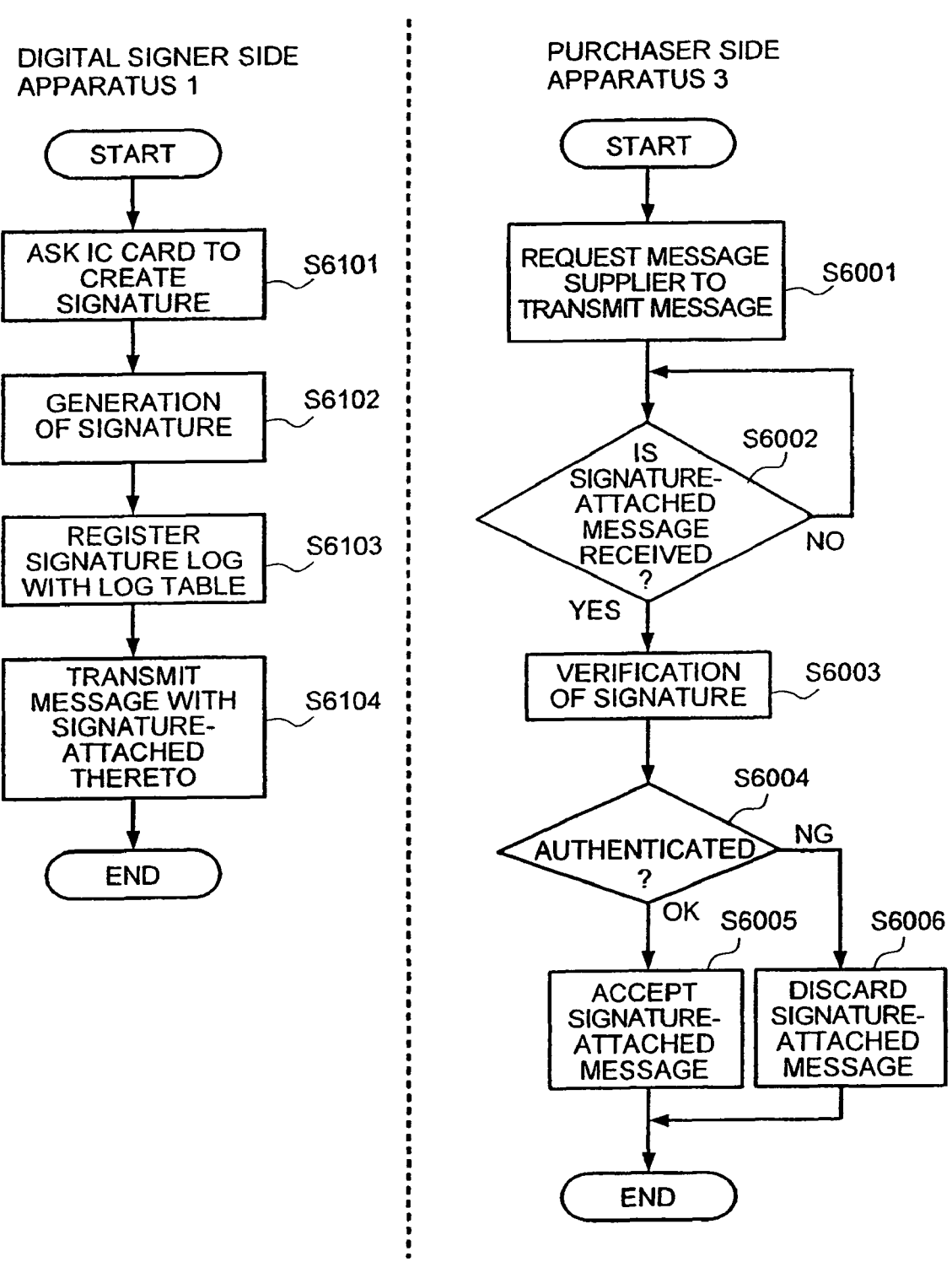
FIG. 4 illustrates a flowchart of representative example processes in which a purchaser side apparatus 3 acquires a digital-signature-attached message from a digital signer side apparatus 1 in the first embodiment of the present invention.

When the mediator side apparatus 7 acts as a purchaser side apparatus 3, the mediator side apparatus 7 performs the flow of steps for the purchaser side apparatus 3 as shown in FIG. 4, and sends a signature-attached message accepted at step S6005 to the purchaser side apparatus 3. This can reduce the burden on the purchaser side apparatus 3 since the purchaser side apparatus 3 does not need to perform the verifying process indicated at step S6003. It should be noted that the mediator side apparatus 7 preferably acquires information about the messages owned by each digital signer side apparatus 1 beforehand, and makes available to each purchaser side apparatus 3 a list of the messages owned by each digital signer side apparatus 1 by use of the World Wide Web or other means.

Each digital signer side apparatus 1 can create a digital-signature-attached message at the request of a digital signer, whether or not a purchaser side apparatus 3 asks it. In this case, the flow of steps for the purchaser side apparatus 3 as shown in FIG. 4 is not performed. However, using the purchaser side apparatus 3, a purchaser of a digital-signature-attached message can verify the signature by causing the digital signature verifier side apparatus 5 to verify the signature as described later.

The steps taken in the above case will be described using as an example digital data whose message has the same value as that of securities (hereinafter such digital data is called an electronic bill). A digital signer who is also an issuer of an electronic bill creates and issues a signature-attached electronic bill by performing the flow of steps for the digital signer side apparatuses 1 as shown in FIG. 4 by use of a digital signer side apparatus 1. It should be noted that since the purchaser of the created signature-attached electronic bill cannot be specified at the time of issuing the electronic bill, the signature log 2235 registered with the signature log table 2234 does not include the address of the purchaser.

The mediator side apparatus 7 acquires signature-attached electronic bills issued by the digital signer side apparatuses 1, and makes them public using the World Wide Web or other means beforehand. Then, the mediator side apparatus 7 transmits a desired signature-attached electronic bill or sends it by postal mail at the request of a purchaser side apparatus 3. A person who wants to purchase an electronic bill can ask the digital signature verifier side apparatus 5 to verify the desired electronic bill beforehand by use of a purchaser side apparatus 3, and take the actual purchase procedure only when the validity of the electronic bill has been confirmed.

Next, referring to FIG. 5, description will be made of representative example processes in specific embodiments in which a purchaser side apparatus 3 asks the digital signature verifier side apparatus 5 to verify a digital-signature-attached message acquired from a digital signer side apparatus 1.

In a purchaser side apparatus 3, when a purchaser has requested verification of a digital-signature-attached message owned by the purchaser side apparatus 3 itself through the input device 36, the verification request processing section 312 asks the digital signature verifier side apparatus 5 to verify the digital-signature-attached message by sending the digital-signature-attached message to the digital signature verifier side apparatus 5 after attaching the address of the digital signer side apparatus 1 from which the message was acquired, to the message (S7001). Then, the verification request processing section 312 waits for the verification results to be transmitted from the digital signature verifier side apparatus 5 (S7002), and displays the verification results using, for example, a display device 37 (S7003).

In the digital signature verifier side apparatus 5, when the signature verification processing section 511 has received a request for verification of a digital-signature-attached message from a purchaser side apparatus 3, the section performs the first-stage verification of the digital-signature-attached message sent with the request, as at steps S6003 and S6004 (S7101, S7102).

If the result is OK at step S7102, the signature verification processing section 511 authenticates the digital-signature-attached message and proceeds to step S7103. If the result is NG at step S7102, the section does not authenticate the message and sends the verification results to the purchaser side apparatus 3 that transmitted the verification request, and to the digital signer side apparatus 1 specified by the address attached to the digital-signature-attached message (S7108).

At step S7103, the signature verification processing section 511 asks the digital signer side apparatus 1 specified by the address attached to the digital-signature-attached message, to transmit all signature logs 2235 (called a signature log list) recorded in the signature log table 2234 (S7103), and waits for the signature log list to be transmitted from the digital signer side apparatus 1 (S7104), and then performs the second-stage verification of the digital-signature-attached message. Specifically, the signature verification processing section 511 checks whether the acquired signature log list includes a signature log that includes the digital signature included in the digital-signature-attached message and a message hash value computed at step S7101 (S7105).

If the acquired signature log list includes the signature log (if the result is OK at step S7106), the signature verification processing section 511 authenticates that the digital-signature-attached message has been validly generated by the digital signer side apparatus 1 that provided the signature log list, and sends the results to the purchaser side apparatus 3 that transmitted the verification request, and to the digital signer side apparatus 1 specified by the address attached to the digital-signature-attached message (S7107).

If the acquired signature log list does not include the signature log (if the result is NG at step S7106), this means that the digital-signature-attached message was not generated by the digital signer side apparatus 1 that provided the signature log list. Accordingly, the signature verification processing section 511 determines that a third party obtained the secret key 2232 one way or another and illegally generated the message posing as the digital signer, and sends the results to the purchaser side apparatus 3 that transmitted the verification request and to the digital signer side apparatus 1 specified by the address attached to the digital-signature-attached message (S7109).

In each digital signer side apparatus 1, the verification request processing section 112 waits for a request for transmission of a signature log list or verification results to be sent (S7201). When the verification request processing section 112 has received a request for transmission of a signature log list, the section reads the signature logs 2235 registered with the signature log table 2234 in the EEPROM 223, and sends them to the digital signature verifier side apparatus 5 (S7202). When the verification request processing section 112 has received verification results (S7203), the section displays the results using, for example, the display device 17 (S7204). Sending the verification results also to a digital signer side apparatus 1 as described above makes it possible to take such a measure as changing the secret key 2232 for generation of signatures when, for example, the verification results indicate that a third party somehow obtained the secret key 2232 and illegally generated a digital signature posing as a digital signer.

It should be noted that in this invention, as a method of sending a history log list from a digital signer side apparatus 1 to the digital signature verifier side apparatus 5, the IC card 22 itself may be sent by, for example, postal mail, in addition to the above method in which the history log list is transmitted through the network.

Next, referring to FIG. 6, description will be made of representative example processes in specific embodiments in which the digital signer side apparatus 1 asks the digital signature verifier side apparatus 5 to verify a digital-signature-attached message generated by the digital signer side apparatus 1 itself.

In a digital signer side apparatus 1, when a digital signer has entered the address of a purchaser side apparatus 3 that will purchase a digital-signature-attached message, through the input device 16, and has requested verification of the digital-signature-attached message, the verification request processing section 112 asks the digital verifier side apparatus 5 to verify the message by sending the entered address of the purchaser side apparatus 3 (S8001). Then, the verification request processing section 112 proceeds to step S8002 and performs processes at the flow of steps S7201 through S7204 shown in FIG. 5.

In the digital signature verifier apparatus 5, when the signature verification processing section 511 has received a request for verification of a digital-signature-attached message from a digital signer side apparatus 1, the section sends a request for transmission of the digital-signature-attached message to be verified and the address of the digital signer side apparatus 1 that has sent the verification request, to the purchaser side apparatus 3 specified by the address sent with the verification request (S8101), and waits for the message to be transmitted (S8102). Then, the signature verification processing section 511 proceeds to step S8103 and performs processes at the flow of steps S7101 through S7109 shown in FIG. 5.

In each purchaser side apparatus 3, the verification request processing section 312 waits for a request for transmission of a digital-signature-attached message to be verified, from the digital signature verifier side apparatus 5 (S8201). Then, from the external storage device 33 or the like, the section reads the digital-signature-attached message acquired from the digital signer side apparatus 1 specified by the address sent with the request, and sends the message to the digital signature verifier side apparatus 5 (S8202). After that, the verification request processing section 312 proceeds to step S8203 and performs processes at the flow of steps S7002 through S7003 shown in FIG. 5.

According to this embodiment, each digital signer side apparatus 1 distributes a digital-signature-attached message that includes a digital signature and a message generated by the digital signer side apparatus 1 itself after registering a signature log 2235 that includes the digital signature and a hash value of the message, with the signature log table 2234.

The digital signature verifier side apparatus 5 acquires a log list made up of registered signature logs 2235 from a digital signer side apparatus 1, and checks whether a signature log that includes a hash value of the message and the digital signature included in the digital-signature-attached message to be verified, is registered. Accordingly, the digital signature verifier side apparatus 5 can determine whether the digital-signature-attached message to be verified has been generated by the digital signer side apparatus 1, and is valid, or a third party has illegally generated the message posing as a digital signer after somehow obtaining the secret key 2232.

In an alternative embodiment, a signature log table may be set in the external storage device 13 of the computer 21, in addition to the EEPROM 223. With this arrangement, when the number of signature logs registered with the signature log table in the EEPROM 223 exceeds a predetermined value (this value may be set considering the capacity of the EEPROM 223) as a result of registering a newly generated signature log with the signature log table in EEPROM 223, the earliest log registered with the signature log table in the EEPROM 223 may be transferred to the signature log table in the external storage device 13 before registering the above new signature log with the signature log table in the EEPROM 223.

In another embodiment, a plurality of signature logs registered with the signature log table in the EEPROM 223 may be registered with the signature log table in the external storage device 13 together at once. This registration of signature logs with the signature log table in the external storage device 13 may be performed when appropriate, according to the instructions of a signer, or the signature logs may be automatically registered each time the number of the signature logs reaches a predetermined value.

In still another embodiment, a newly generated signature log may be registered with both the signature log table in the EEPROM 223 and the signature log table in the external storage device 13 of the computer 21, and when the number of the signature logs registered with the signature log table in the EEPROM 223 exceeds a predetermined value as a result of registering the above newly generated signature log with the signature log table in the EEPROM 223, the earliest signature log registered with the signature log table in the EEPROM 223 may be deleted before registering the above newly generated signature log with the signature log table in the EEPROM 223.

In such specific embodiments, it is possible to realize digital signer side apparatus 1 even when the capacity of the EEPROM 223 is small.

In order to prevent a digital signer from altering a signature log, it is preferred that the signature log table set in the external storage device 13 is set so that the table can be written only from the IC card 22, or a non-rewritable storage medium such as a CD-R is used.

Further, instead of setting a signature log table in the EEPROM 223, a signature log management apparatus 9 may be newly added to the configuration shown FIG. 1 to manage the signature log table for each digital signer side apparatus 1. With this arrangement, each digital signer side apparatus 1 may register a signature log with the signature log table corresponding to each digital signer side apparatus 1 itself each time a digital signature is newly generated, or as is the case with registration with the signature log table in the external storage device 13, a plurality of signature logs may be registered together at once with a signature log table which is set in the signature log management apparatus 9 and corresponds to each digital signer side apparatus 1.

Figure 5:
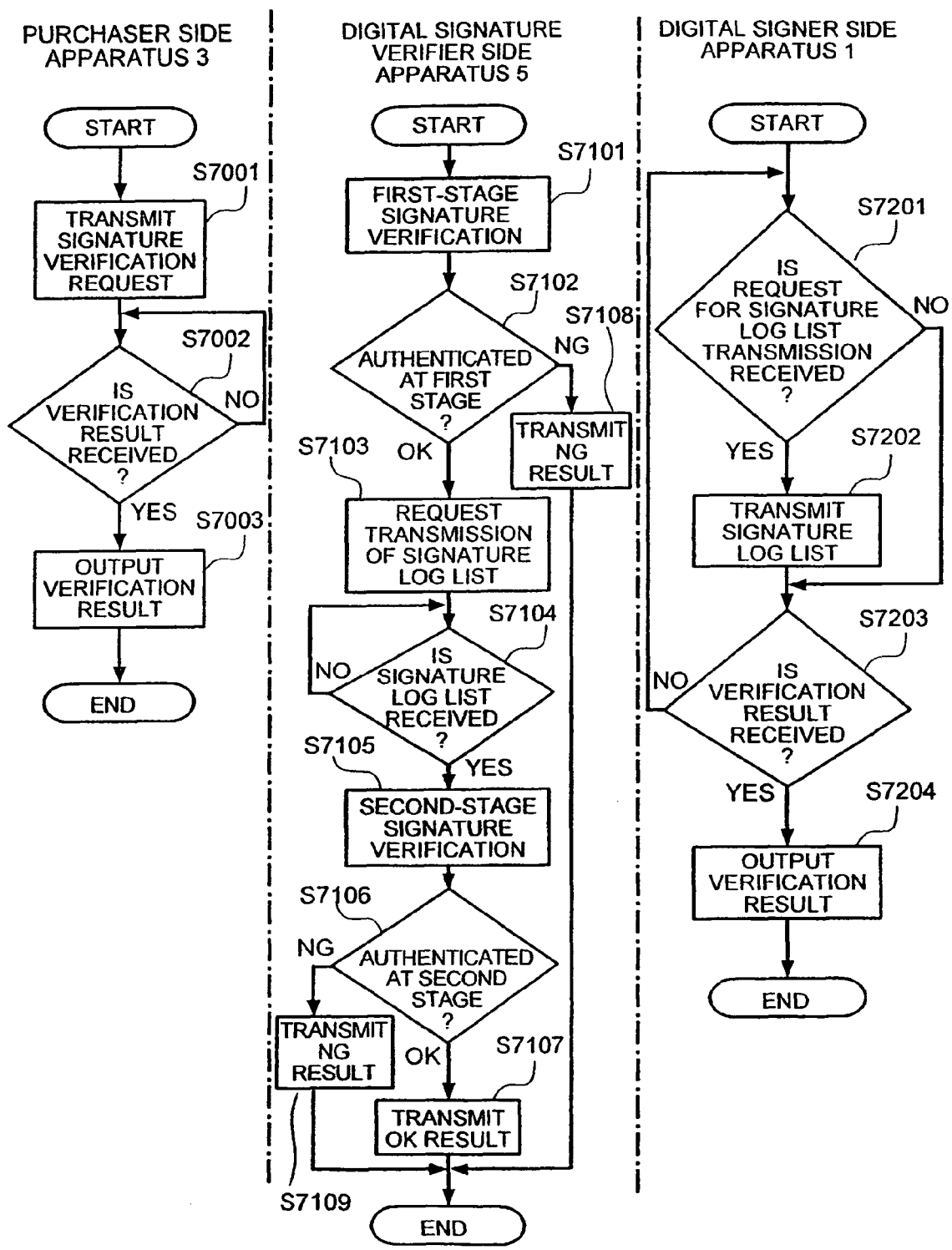
FIG. 5 illustrates a flowchart of representative example processes in which a purchaser side apparatus 3 asks a digital signature verifier side apparatus 5 to verify a digital-signature-attached message acquired from a digital signer side apparatus 1 in the first embodiment of the present invention.

In this case, at step S7103 of a flow shown in FIG. 5, the digital signature verifier side apparatus 5 sends to the signature log management apparatus 9 a request for transmission of a signature log list, attaching the address of the digital signer side apparatus 1 that created a digital-signature-attached message to be verified, to the request. Furthermore, steps S7201 and S7202 of a flow shown in FIG. 5 are performed by the signature log management apparatus 9. Upon receiving a request for transmission of a signature log list, the signature log management apparatus 9 sends to the digital signature verifier side apparatus 5 the signature log list of the digital signer side apparatus 1 specified by the address attached to the request. This prevents a digital signer from altering a signature log.

It should be noted that the signature log management apparatus 9 may be created on the same computer as that on which the digital signature verifier side apparatus 5 resides, or the signature log management apparatus 9 may be created on both the same and a different computers so that signature logs may be initially managed by the signature log management apparatus on the same computer and when the number of signature logs has reached a predetermined value, they may be registered together at once with the signature log management apparatus on the different computer.

When any privacy and other problems do not arise, signature log data in the signature log management apparatus 9 may be made public to other apparatuses connected through the network for a certain period of time or indefinitely after the signature is generated. It should be noted, however, that the system is assumed to be set so that the logs cannot be rewritten or deleted. With this, for example, a purchaser can make sure that the records of transactions related to the purchaser are reflected in logs of a signer. Furthermore, by managing signature logs so that they can be viewed from many other apparatuses, it becomes difficult for a signer to alter his or her own signature log data, resulting in improved reliability of the entire system. An apparatus for thus making signature log data public may be provided separately from the signature log management apparatus.

Specific information may be set to each IC card 22 so that by using this information, it can be guaranteed that a registered signature log is produced surely for a signature generated by an IC card 22. For example, an IC card issuer secretly sets specific information to each IC card at the time of issuing the card, concealing it even from the signer who owns it. Each time a digital signature is generated by the IC card, the specific information set to the IC card is used to generate a MAC (Message Authentication Code) for the digital signature by utilizing the information as a MAC-generation secret key, which is different from the secret key 2232 for generating a digital signature, and the MAC is registered with a signature log table, together with the signature log. A signature log list including this MAC is transmitted in response to a request for transmission of a signature log list from a digital signature verifier.

Adoption of the above method makes it difficult to alter a signature log. This is because a digital signature verifier can acquire specific information set to the IC card that generated the signature, from the IC card issuer beforehand or as necessary, and by checking the validity of the MAC using the acquired information, the verifier can detect alteration of the signature log. Furthermore, since information that even the signer does not know is used as a secret key, forging of a signature log by the signer itself also can be prevented.

In addition to storing a MAC in a signature log table, the MAC may be output to a purchaser together with a digital-signature-attached message so that it can be used as means for reinforcing the purchaser's capability to check the validity of a signature attached to a purchased message.

When there is provided the signature log management apparatus 9 in which a signature log table is set, it may be arranged such that the signature log management apparatus 9 also can acquire specific information set to an IC card that has generated a signature, from the IC card issuer beforehand or as necessary, so as to check the validity of the MAC when registering the signature log with the signature log table set in the signature log management apparatus 9, and register only a valid signature log. In this case, when an attempt is made to register a signature log whose MAC is not valid, an alarm may be sent to the signer or the entire system so that from now on, the secret key 2232 for signing and the signing system will not be used, regarding that it has become possible to forge a signature due to disclosure of the secret key or some other reason.

Instead of using specific information set to each IC card as a secret key for generating a MAC, the specific information can be used as a secret key for generating another digital signature so as to guarantee that a signature has surely been generated by use of a specific IC card 22, which also makes it difficult to forge a signature log as is the case with a MAC. The above method eliminates the need of acquiring specific information set to each IC card in order to verify that a signature has been generated by use of an IC card 22, and, instead, requires only public-key information which corresponds to the specific information and is available to anyone. Therefore, unlike the use of a MAC, it is easy to employ this method as a means for helping a purchaser confirm the validity of a purchased message.

In the above method, from the viewpoint of avoiding the risk of forgery of digital signatures, which is increased by improved decryption algorithms, it is desirable to use a digital signing system different from one in which a digital signature is sent to a purchaser by attaching it to a message, that is, as a signature-attached message. Since from the viewpoint of reducing the scale of its implementation in the IC card 22, use of the same digital signing system is more advantageous, the signing system may be determined depending on conditions.

Since specific information set to each IC card is used as a secret key, dynamic update of the information, which means that the secret-key information is not fixed, offers the advantage of making it difficult to analyze the secret key. In the above method, to verify the validity of a signature log using specific information set to each IC card, it is necessary to know how to update the specific information. For example, after using specific information set to an IC card, a hash value of the specific information may be computed so that it can be used as new specific information to be set to the IC card.

Next, description will be made of a second embodiment of the present invention in which alteration of a signature log can be more effectively prevented. Each apparatus of a system in accordance with this embodiment basically has the same configuration as that for the first embodiment except for the components of signature logs 2235 stored in a signature log table 2234.

Although the same processes as those for the first embodiment, shown in FIG. 4, are performed when a purchaser side apparatus 3 acquires a digital-signature-attached message from a digital signer side apparatus 1, the contents of specific signature generation processing by the digital signer side apparatus 1 are different, and so are the contents of specific signature verification processing by the purchaser side apparatus 3.

In the digital signer side apparatus 1, a signature generation processing section 2211 generates a digital signature $Sign_N$ by applying a secret key 2232 to a set of a hash value $h(M_{N-1})$ of a message $M_{N-1}$ and a digital signature $Sign_{N-1}$ (this set "$(h(M_{N-1}), Sign_{N-1})$" is referred to as previous data $P_{N-1}$) included in a signature log 2235 generated in the last (N−1th) signature generation processing, and to a hash value $h(M_N)$ of a message $M_N$ sent from a signature-attached message creation processing section 111 (S6102). When the initial (first) signature is generated, an initial value IV, which is set as a value common to the entire system or a value specific to each apparatus, may be used as previous data P0, or the initial previous data P0 may be omitted. The signature generation processing section 2211 registers a signature log 2235 which is comprised of the previous data $P_{N-1}$, the hash value $h(M_N)$ of the message, the digital signature $Sign_N$, and the address of a purchaser side apparatus 3 that has made a transmission request, with the signature log table 2234 (S6103). The signature generation processing section 2211, then, sends the previous data $P_{N-1}$, the digital signature $Sign_N$, and a public key certificate 2233 stored in an EEPROM 223 to the signature-attached message creation processing section 111. The signature-attached message creation processing section 111 creates a digital-signature-attached message by attaching the previous data $P_{N-1}$ and the digital signature $Sign_N$ to the message $M_N$ to be transmitted, and transmits to the purchaser side apparatus 3 the digital-signature-attached message with the public key certificate 2233 attached thereto (S6104).

In the above embodiment, when the digital signature $Sign_N$ is generated, a hash value $h(P_{N-1})$ of the previous data $P_{N-1}$ may be used instead of the previous data itself. In this case, as data to be stored in the signature log table, the hash value $h(P_{N-1})$ of the previous data $P_{N-1}$ may also be used instead of the previous data itself. Furthermore, as previous data to be used for the Nth signature, the hash value $h(M_{N-1})$ of the message $M_{N-1}$, the digital signature $Sign_{N-1}$, and, in addition, a hash value $h(P_{N-2})$ of previous data $P_{N-2}$, which is used for the N−1th signature, are used as a three-component set. In addition, a hash function used to compute a hash value of previous data may be different from that used to compute a hash value of a message. It should be noted that when the previous data $P_{N-1}$ can be computed from other data, as in the case where $(h(M_{N-1}), Sign_{N-1})$ is used as the previous data $P_{N-1}$, instead of storing and then using $P_i(0<i<N-1)$, previous data may not be stored but calculated as necessary to save the data storage area.

As a result of the above processing, each signature log 2235 stored in the signature log table 2234 comprises previous data, a hash value of a message, and a digital signature as shown in FIG. 7.

In the purchaser side apparatus 3, as a comparison target at comparison step S6003, instead of using only a hash value computed from the message included in a digital-signature-attached message, a set of the hash value and the previous data included in the digital-signature-attached message is used.

Next, referring to FIG. 8, description will be made of representative example processes in specific embodiments in which a purchaser side apparatus 3 asks a digital signature verifier side apparatus 5 to verify a digital-signature-attached message acquired from a digital signer side apparatus 1. It should be noted that the following description explains an example of verification processes performed in the condition that the determination of "forged" is disadvantageous to the signer.

Figure 8:
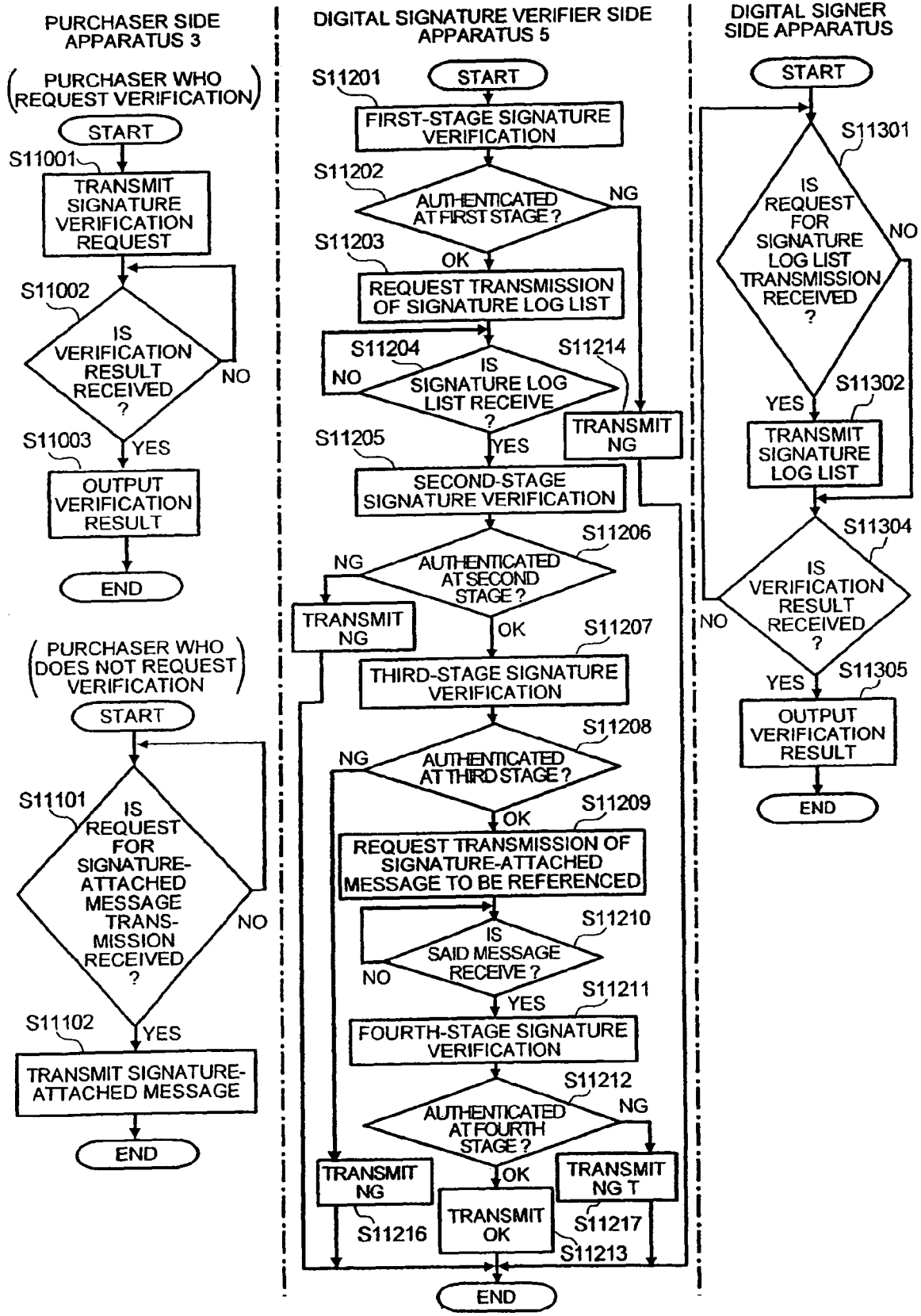
FIG. 8 illustrates a flowchart of representative example processes in which a purchaser side apparatus 3 asks a digital signature verifier side apparatus 5 to verify a digital-signature-attached message acquired from a digital signer side apparatus 1 in the second embodiment of the present invention.

Processes at steps S11001, S1102, and S11003 in FIG. 8 are the same as those at steps S7001, S7002, and S7003 in FIG. 5, respectively.

When a verification request processing section 312 has received a request for transmission of a digital-signature-attached message to be used as a reference material from the digital signature verifier side apparatus 5 (S11101), the section reads the digital-signature-attached message acquired from the digital signer side apparatus 1 specified by the address attached to the request, from, for example, an external storage device 33 or the like, and transmits the message to the digital signature verifier side apparatus 5 (S11102).

In the digital signature verifier side apparatus 5, a signature verification processing section 511 performs the first-stage verification, using the digital signature included in the digitalsignature-attached message and the public key of the public key certificate 2233 attached to the digital-signature-attached message (S11201). When the signature is authenticated (if the result is OK at step S11202), the processes at steps S11203 and S11204, which are the same as those at steps S7103 and S7104, are performed. When the signature is not authenticated (if the result is NG at step S11202), on the other hand, the process at step S11214, which is the same as that at step S7108, is performed.

The signature verification processing section 511 performs the second-stage verification of the digital-signature-attached message. Specifically, the section checks whether a signature log that includes the digital signature and the previous data included in the digital-signature-attached message and a hash value of a message acquired at step S11201 is registered with an acquired signature log list (S11205).

If the signature log is registered (if the result is OK at step S11206), the signature verification processing section 511 makes the same determination as that at step 7106, and performs the third-stage verification of the digital-signature-attached message. Specifically, the signature verification processing section 511 reads the message hash value and the digital signature included in the signature log registered immediately before the signature log corresponding to the verification target digital-signature-attached message in the signature log list acquired at step S11204. For example, in FIG. 7, when the Nth signature log includes the digital signature and the previous data included in the verification target digital-signature-attached message and the message hash value acquired at step 11201, the signature verification processing section 511 reads the message hash value and the digital signature included in the N–1th signature log. The signature verification processing section 511 compares both the message hash value and the digital signature included in the immediately previous registered signature log, against the previous data included in the verification target digital-signature-attached message. As described above, the previous data is comprised of the message hash value and the digital signature included in the immediately previous registered signature log (S11207).

When they do not coincide (if the result is NG at step S11208), the signature verification processing section 511 authenticates that the signature log corresponding to the verification target digital-signature-attached message has been altered, and transmits the results to the purchaser side apparatus 3 that has transmitted the verification request and to the digital signer side apparatus 1 specified by the address attached to the digital-signature-attached message (S11216). When they coincide (if the result is OK at step S11206), the section proceeds to step S11209.

At step S11209, the signature verification processing section 511 sends a request for transmission of a digital-signature-attached message to be used as a reference material, to the purchaser side apparatus 3 specified by the purchaser address included in the signature log registered immediately before the signature log corresponding to the verification target digital-signature-attached message, attaching the address of the digital signer side apparatus 1 that has transmitted the verification request, to the request, and waits for the message to be transmitted (S11210).

The signature verification processing section 511 performs the fourth-stage verification of the digital-signature-attached message acquired as a reference material.

Specifically, the section computes a hash value of the message included in the digital-signature-attached message acquired at step S11210. Then, the signature verification processing section 511 checks whether the digital signature and the previous data included in the digital-signature-attached message acquired at step S11210 and the hash value of the message coincide with the contents of the signature log registered immediately before the signature log corresponding to the verification target digital-signature-attached message, in the signature log list acquired at step S11204 (S11211).

When they do not coincide (if the result is NG at step S11212), the signature verification processing section 511 determines that both the signature log corresponding to the verification target digital-signature-attached message and the immediately previous registered signature log corresponding to the digital-signature-attached message used as a reference material may have been altered, producing the third-stage verification result OK at step S11208, and transmits the results to the purchaser side apparatus 3 that has transmitted the verification request and to the digital signer side apparatus 1 specified by the address attached to the digital-signature-attached messages (S11217). When they coincide (if the result is OK at step S11212), on the other hand, the signature verification processing section 511 authenticates that the verification target digital-signature-attached message has been generated by the digital signer side apparatus 1 that provided the signature log list and the message is valid, and transmits the results to the purchaser side apparatus 3 that has transmitted the verification request and to the digital signer side apparatus 1 specified by the address attached to the digital-signature-attached messages (S11213). In the digital signer side apparatus 1, the processes performed at steps S11301 through S11305 are the same as those at steps S7201 through S7204.

Figure 9:
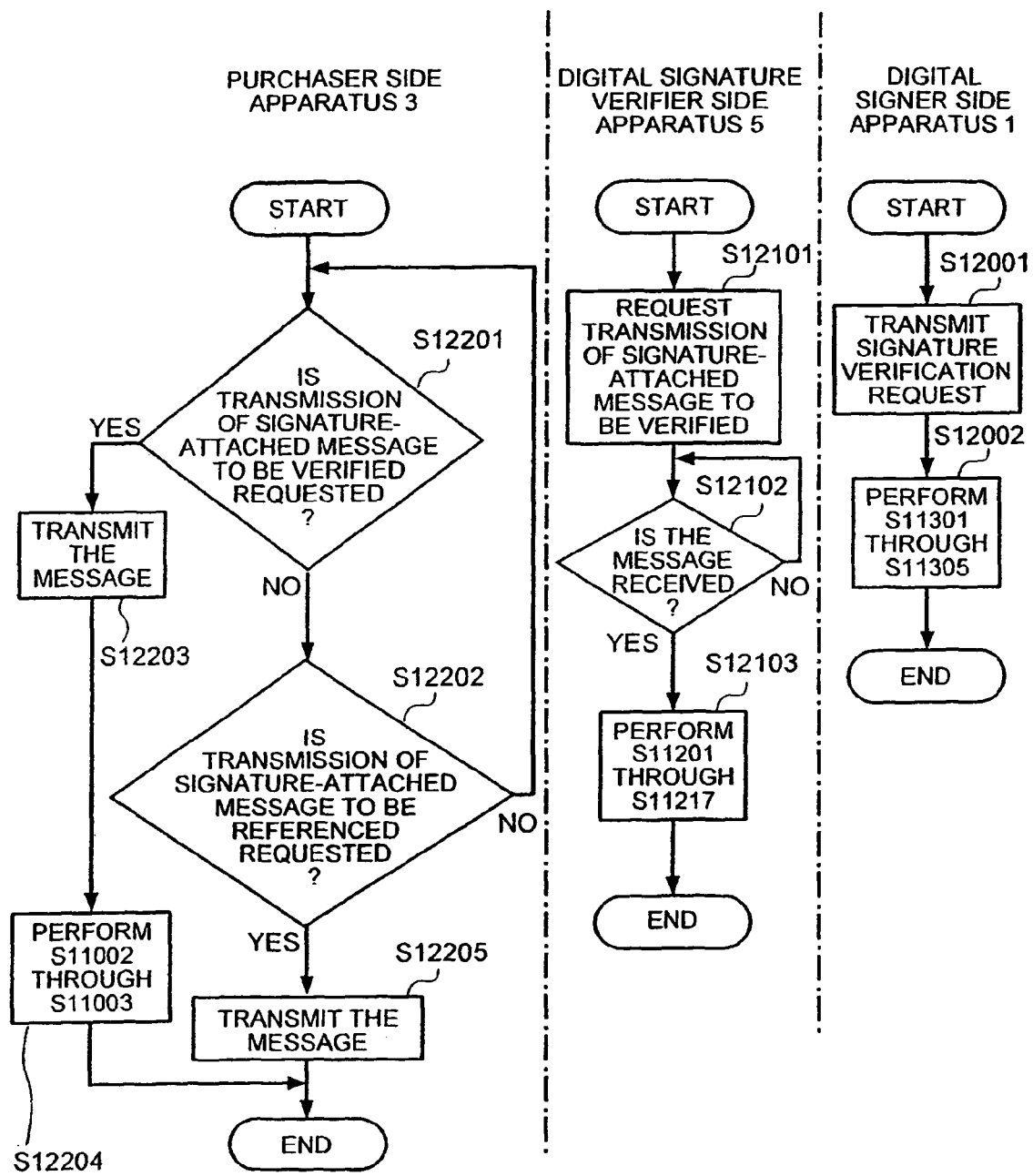
FIG. 9 illustrates a flowchart of representative example processes in which a digital signer side apparatus 1 asks a digital signature verifier side apparatus 5 to verify a digital-signature-attached message that the digital signer side apparatus 1 itself has generated in the second embodiment of the present invention.

Next, referring to FIG. 9, description will be made of representative example processes in specific embodiments in which a digital signer side apparatus 1 asks the digital signature verifier side apparatus 5 to verify a digital-signature-attached message that the digital signer side apparatus 1 has generated.

In the digital signer side apparatus 1, the process performed at step S12001 is the same as that at step S8001, and at step S12002, processes at the flow of steps S11301 through S11305 shown in FIG. 8 are performed.

In the digital signature verifier side apparatus 5, the processes performed at steps S12101 and S12102 are the same as those at steps S8101 and S8102, and at step S12103, the processes at the flow of steps S11201 through S11217 shown in FIG. 8 are performed.

In a purchaser side apparatus 3, the processes performed at steps S12201 and S12203 are the same as those at steps S8201 and S8202, and at S12204, processes at steps S11002 through S11003 shown in FIG. 8 are performed.

When the purchaser side apparatus 3 has received a request for transmission of a digital-signature-attached message to be used as a reference material from the digital signature verifier apparatus 5 (the process at step S12202 performed if the result is NO at step S12201), the verification request processing section 312 reads the digital-signature-attached message to be used as a reference material, acquired from the digital signer side apparatus 1 specified by the address attached to the request, and transmits the message to the digital signature verifier side apparatus 5 (S12205).

In this embodiment, the validity of a digital-signature-attached message can be more surely checked.

The third-stage signature verification according to the above embodiment checks the matching of the signature log corresponding to a verification target digital-signature-attached message, which is expressed as Nth signature log, with the immediately previous N–1th signature log (whether mutual consistency is maintained). Similarly, the matching of the N−1th signature log with the immediately previous N−2th signature log may be further checked. By repeating this, mutual consistency of more signature logs included in a signature log list may be checked so as to more surely ensure the reliability of the signature log list.

Further, in the third-stage signature verification according to the above embodiment, a series of an arbitrary number of signature logs including the signature log corresponding to a verification target digital-signature-attached message may be selected from the signature logs registered with the signature log table 2234. And for the series of signature logs, the third-stage signature verification may check whether the previous data included in a signature log coincides with the digital signature and the message hash value included in the immediately previous signature log in order to detect alteration of a signature log.

Alteration of a signature log can also be detected by checking whether the message hash value of a digital-signature-attached message is reflected in digital signatures included in one or more signature logs registered after the signature log corresponding to the digital-signature-attached message.

In this embodiment, to forge a past electronic signature, it is necessary to forge one or more electronic signatures created before or after the creation of the electronic signature to be forged, while maintaining their consistency. This increases the difficulty of forging a past electronic signature, making it difficult to attack on authorized business operators by forging their signatures. An authorized business operator also can put himself or herself in a position in which it is difficult for the operator to forge an alibi for any illegal conduct, which makes more persuasive to a mediator the assertion that the operator is not involved in any illegal conduct when the operator has suffered a malicious attack.

In the above embodiment, when the second-stage signature verification proves that signature data included in a verification target digital-signature-attached message is not included in a signature log list provided by the signer, it is determined that the digital signature to be verified is forged, while when the second-stage signature verification proves that the signature data is included in the signature log list, the third-stage and the fourth-stage verifications are performed to verify the validity of the signature log list. This is because when the determination of "forged" is disadvantageous to a signer who provides a signature log list, it is unthinkable for the signer to provide a forged signature log list.

In the case where the determination of "a signature is valid" is disadvantageous to a signer who provides a signature log list, on the other hand, when the second-stage signature verification proves that signature data to be verified is included in a submitted signature log list, it may be determined that the digital signature is valid, while when the signature data is not included in the signature log list, the third-stage and the fourth-stage verifications may be performed to verify the validity of the signature log list.

Or, after receiving a signature log list at step S11204, the signature verification processing section may first check the validity of the signature log list, and after the validity is confirmed, if signature data to be verified is included in the valid signature log list, it may be determined that the signature is valid.

When a signer cannot submit a signature log list in full to a verifier due to data corruption or some other reason, not all of the information provided by the submitted signature log list (with its some part missing) is generally reliable. However, by using the following method, it is possible to extract reliable signature logs from the sent information.

In the digital signature verifier side apparatus 5, of the signature logs included in the submitted signature log list, those that prove to be in areas which cannot be controlled by the signer itself, can be regarded as reliable signature logs.

For example, signatures to be stored in the EEPROM 223 area as signature logs 2235 are automatically written when the signer generates the signatures by use of the IC card 22. Since this area is set so that it cannot be rewritten or deleted, the signer itself cannot control (alter) the area. Therefore, the logs corresponding to signatures stored in the EEPROM 223 area can be regarded as reliable.

Similarly, the signature logs corresponding to signatures stored in the signature log management apparatus 9 or the like that is a reliable third party can be regarded as reliable since the signer cannot control the signatures.

Furthermore, the signature log corresponding to a signature made public by newspapers, broadcasting, or the like, so that it has become known to many and unspecified people at some time point before a signature verifier verifies it, for example, immediately after it is generated by a signer, can be also regarded as reliable since after the above time point, it is very difficult for the signer to do anything so that it looks as if the signature had not existed, that is, the signer itself cannot control the past existence of the signature.

When another purchaser who is disinterested owns a signature (for example, as a signature log), the signature log is also regarded as reliable.

Further, if it is confirmed that a reliable signature log and the signature log registered immediately before the reliable signature log match, that is, they are consistent with each other, the immediately previous signature log also can be regarded as a reliable signature log. This is because, since in this invention a signature log includes a hash value of the immediately previous message or signature, it is very difficult to forge the immediately previous signature log so that it coincides with a hash value included in a reliable signature log even when it has become easy to forge the digital signature itself due to disclosure of a secret key or some other reason. By repeating this procedure, that is, going back through a series of signature logs, starting from a reliable signature log, while confirming that each signature log is consistent with the immediately previous one, the range of reliable signature logs included in a submitted log list can be determined since the range of signature logs that are consistent with one another starting from a reliable signature log can be regarded as reliable.

According to above embodiment, a digital signer side apparatus 1 generates a digital signature by applying a secret key 2232 to a previous data $P_{N-1}$, and to a hash value of $h(M_N)$ of a message $M_N$. Similarly, a digital signer side apparatus 1 may generate a digital signature by applying a secret key 2232 to other data in addition to a previous data and a hash value of a message. For example, a digital signer side apparatus may generate a digital signature by applying a secret key 2232 to a public key certificate 2233, which is sent to a purchaser side apparatus 3, or its hash value, and to a previous data, and to a hash value of a message. This makes it easy to prove later that the public key certificate existed when the digital signature was generated. That is, because it is very difficult to forge the signature log, which is reflected by the public key certificate, so that its hash value coincides with a hash value included in immediately after signature log, this makes it easy to prove that there existed the public key certificate even when it has become easy to forge a certificate which was issued by certificate authority. Further, any data which is intended to prove that it exists when the signature is generated, may be used as well as a certificate. In order to be verified the signature by a purchaser side apparatus 3, the data, or modified data which makes it possible to verify the signature (e.g. a hash value of the data), is sent to a purchaser side apparatus 3 together with a message and a signature.

As in the embodiments described herein above, a signature log table 2234 may be set in an external storage device 13 of a computer 21, in addition to the EEPROM 223.

Instead of setting the signature log table 2234 in the EEPROM 223, the signature log management apparatus 9 may be provided to manage the signature log table for each digital signer side apparatus 1, as described earlier.

As in the embodiments described herein above, this signature log management apparatus 9 may be created on the same computer as that on which the digital signature verifier side apparatus 5 resides.

As in the embodiments described herein above, specific information (a serial number or the like) may be set to each IC card so that by using this information, specific data may be generated to guarantee that a signature has surely been generated by use of the IC card.

When there is provided the signature log management apparatus 9, processes at the flow of steps S11207 and S11208 shown in FIG. 8 (the third-stage signature verification) may be performed by the signature log management apparatus 9 before registering a signature log with a signature log list so that only when the previous data included in the signature log coincides with the message hash value and the signature included in the latest signature log data registered with the signature log list, is the signature log permitted to be registered with the signature log list. In this case, in the digital signature verifier side apparatus 5, the flow of steps S111207 and S11209 shown in FIG. 8 (the third-stage signature verification) can be omitted.

As in the embodiments described herein above, a plurality of signature logs may be registered together at once with a signature log list managed by the signature log management apparatus 9. In this case, in addition, a message indicating registration with the signature log list may be created, and a signature may be generated for this message so that the registration with the signature log list is reflected in the signature log list of the digital signer side apparatus 1.

Next, description will be made of a third embodiment, in which, in addition to the first embodiment, time information is further included in each digital signature so as to verify the validity of the digital signature also using this time information.

This system is configured so that a timestamp issuing apparatus 8, which issues a timestamp for a digital signature sent from each digital signer side apparatus 1, is added to a system according to the first embodiment shown in FIG. 1.

The schematic configuration of the timestamp issuing apparatus 8 is the same as that shown in FIG. 2.

An external storage device 13 stores a timestamp issuing program 831, which generates a timestamp by encrypting a digital signature and time data sent from a digital signer side apparatus 1, a secret key 832 used to generate a timestamp, and a public key certificate 833 containing a public key paired with the secret key 832. These are loaded into a RAM 12, and are executed by a CPU 11 as a process called a timestamp issuance processing section 811.

Figure 10:
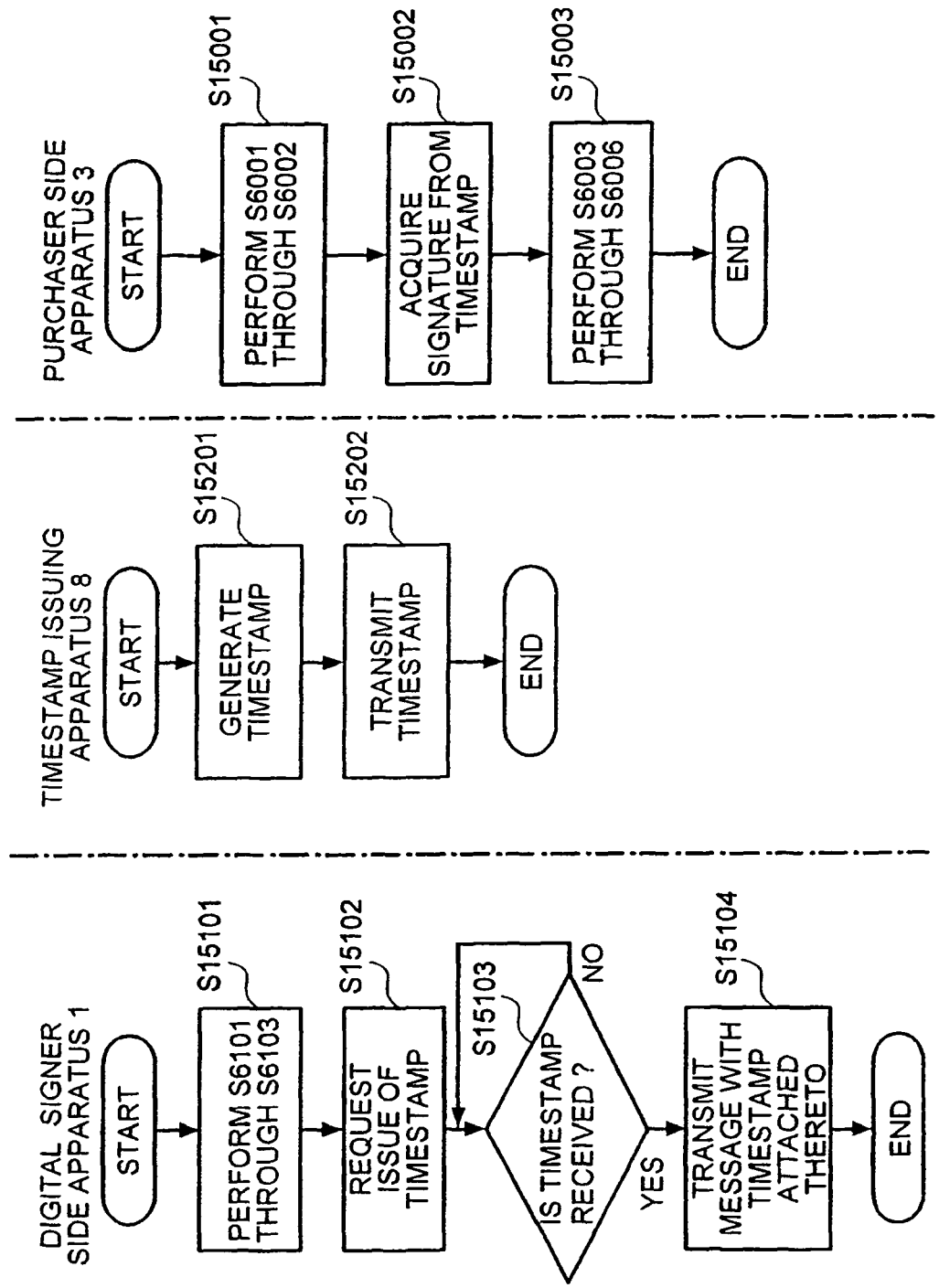
FIG. 10 illustrates a flowchart of representative example processes in which a purchaser side apparatus 3 acquires a digital-signature-attached message from a digital signer side apparatus 1 in the third embodiment of the present invention.

Referring to FIG. 10, description will be made of representative example processes in specific embodiments in which a purchaser side apparatus 3 acquires a digital-signature-attached message from a digital signer side apparatus 1.

The digital signer side apparatus 1 performs processes at steps S6101 through S6103 shown in FIG. 4 (S15101). A signature-attached message creation processing section 111 asks the timestamp issuing apparatus 8 to issue a timestamp by transmitting a digital signature sent from a signature generation processing section 2211 to the timestamp issuing apparatus 8 (S15102). When the signature-attached message creation processing section 111 has received a timestamp from the timestamp issuing apparatus 8 (S15103), the section creates a digital-signature-attached message by attaching the timestamp to a message to be transmitted, and transmits the time stamped message to the purchaser side apparatus 3 that has requested the transmission, attaching both the public key certificate 2233 sent with the digital signature from the signature generation processing section 2211 and the public key certificate 833 sent with the timestamp from the timestamp issuing apparatus 8, to the time stamped message (S15104).

In the timestamp issuing apparatus 8, upon receiving a digital signature from a digital signer side apparatus 1, the timestamp issuance processing section 811 generates a timestamp (S15201). Specifically, the section generates a timestamp by encrypting the digital signature sent from the digital signer side apparatus 1, and time data indicating the reception time of the digital signature by use of the secret key 832 stored in an external storage device 83. The timestamp issuance processing section 811 attaches the public key certificate 833 stored in the external storage device 83 to the generated timestamp, and transmits the certificate-attached timestamp to the digital signer side apparatus 1 that has transmitted the digital signature (S15202).

The purchaser side apparatus 3 acquires a digital-signature-attached message by performing the processes at steps S6001 through S6002 shown in FIG. 4 (S15001). Next, a signature-attached message acquisition processing section 311 acquires a digital signature by decrypting the timestamp included in the received digital-signature-attached message, using the public key (the public key of the timestamp issuance apparatus 8) of a public key certificate 821 attached to the message (S15002). Then, the signature-attached message acquisition processing section 311 performs the processes at steps S6004 through S6006 to verify the digital signature (S15003).

Figure 11:
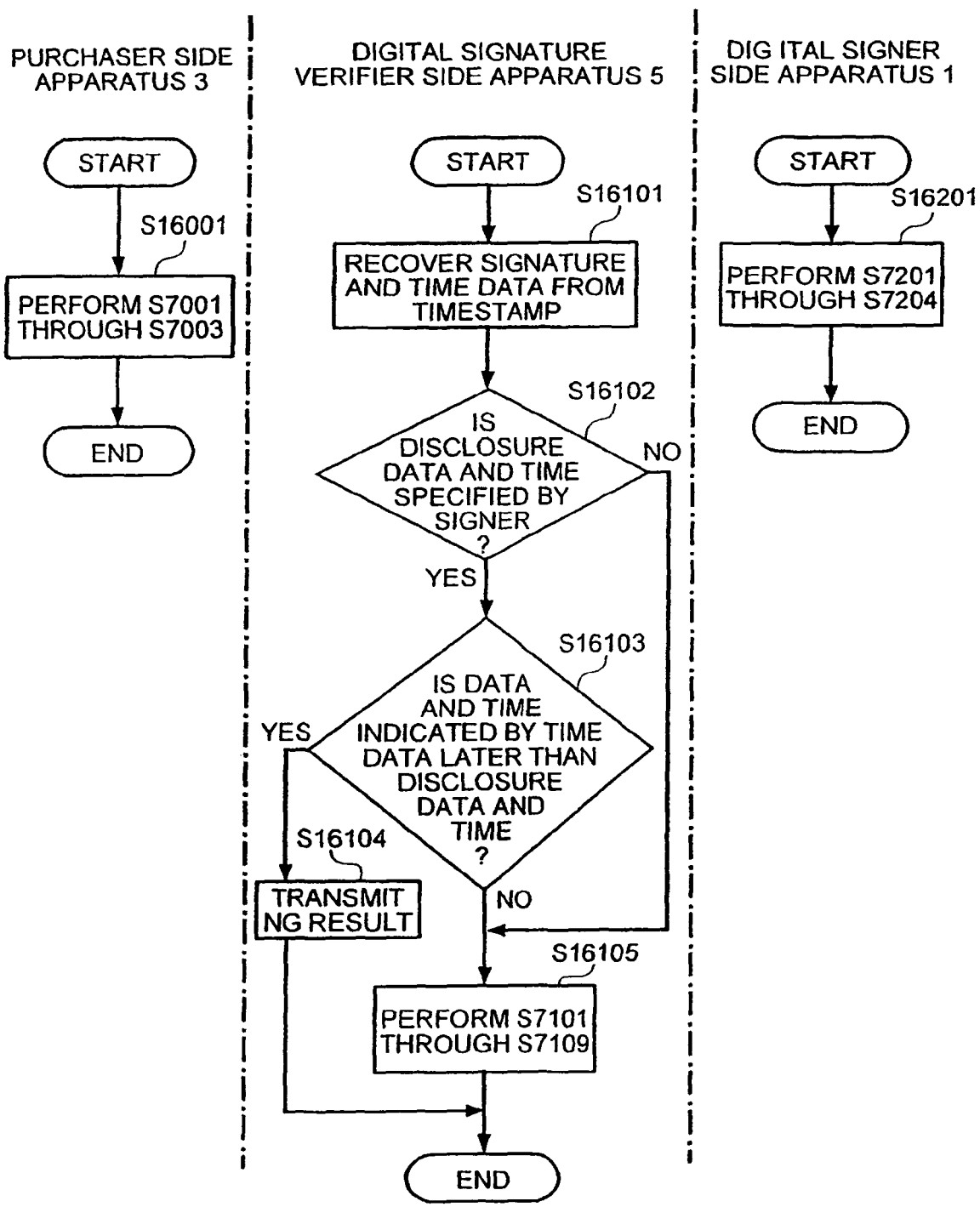
FIG. 11 illustrates a flowchart representative example processes in which a purchaser side apparatus 3 asks a digital signature verifier side apparatus 5 to verify a digital-signature-attached message acquired from a digital signer side apparatus 1 in the third embodiment of the present invention.

Referring to FIG. 11, description will be made of representative example processes in specific embodiments in which a purchaser side apparatus 3 asks a digital signature verifier side apparatus 5 to verify a digital-signature-attached message acquired from a digital signer side apparatus 1.

Incidentally, in this embodiment, it is assumed that when a digital signer, who is a user of a digital signer side apparatus 1, has found that a secret key 2232 which the digital signer secretly holds has been disclosed and a third party may have illegally obtained the secret key, the digital signer notifies a digital signature verifier of the disclosure, specifying its date and time. Then, the digital signature verifier stores the date and time given by the digital signer and the address of the digital signer side apparatus 1 used by the digital signer, as a set, in an external storage device 53 of the digital signature verifier apparatus 5.

A verification request processing section 312 performs the processes at the flow of steps S7001 through S7003 shown in FIG. 5 to acquire verification results from the digital signature verifier side apparatus 5 (S16001).

In the digital signature verifier side apparatus 5, when a signature verification processing section 511 has received a request for verification of a digital-signature-attached message from a purchaser side apparatus 3, the section decrypts the timestamp included in the digital-signature-attached message sent with the request, using the public key (the public key of the timestamp issuing apparatus 8) of the public key certificate 821 attached to the digital-signature-attached message to acquire time data and a digital signature (S16101).

The signature verification processing section 511 checks the external storage device 53 to see whether disclosure date and time of the secret key 2232 is set for the digital signer side apparatus 1 specified by the address attached to the digital-signature-attached message (S16102). When the disclosure date and time has been set, the signature verification processing section 511 proceeds to step S16103, while when no disclosure date and time has been set, the section proceeds to step S16105 and performs the processes at steps S7101 through S7109 shown in FIG. 5.

At step S16103, the signature verification processing section 511 checks whether the date and time indicated by the time data acquired at step S16101 is later than the disclosure date and time set in the external storage device 53 (S16103). If it is later than the disclosure date and time, the signature verification processing section 511 determines that the digital-signature-attached message to be verified is invalid, and transmits the results to the purchaser side apparatus 3 that has transmitted the verification request and to the digital signer side apparatus 1 specified by the address attached to the digital-signature-attached message (S16104). If it is not later than the disclosure date and time, on the other hand, the section proceeds to step S16105 and performs the processes at steps S7101 through S7109.

In the digital signer side apparatus 1, a verification request processing section 112 performs the processes at steps S7201 through S7204 shown in FIG. 5 (S16201).

Next, description will be made of representative example processes in specific embodiments in which a digital signer side apparatus 1 asks the digital signature verifier side apparatus 5 to verify a digital-signature-attached message that the digital signer side apparatus 1 has generated.

Figure 6:
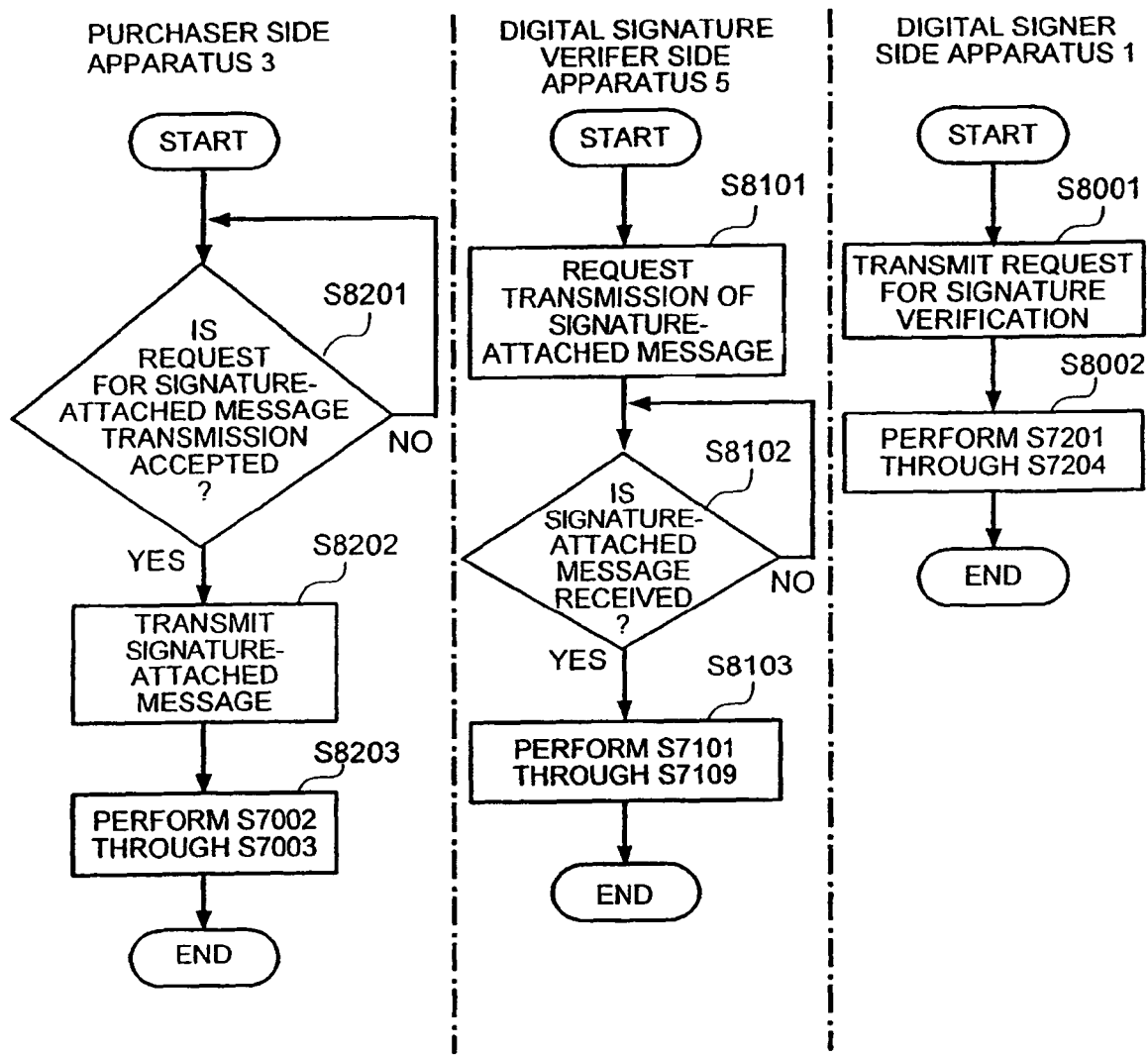
FIG. 6 illustrates a flowchart of representative example processes in which a digital signer side apparatus 1 asks a digital signature verifier side apparatus 5 to verify a digital-signature-attached message that the digital signer side apparatus 1 itself has generated in the first embodiment of the present invention.

The digital signer side apparatus 1 performs the same processes as those at steps S8001 through S8002 shown in FIG. 6.

In the digital signature verifier side apparatus 5, when the signature verification processing section 511 has received a request for verification of a digital-signature-attached message from a digital signer side apparatus 1, the section asks the purchaser side apparatus 3 specified by the address sent with the request to transmit the digital-signature-attached message with the address of the digital signer side apparatus 1 that has transmitted the verification request, attached thereto, and waits for the message to be sent. Then, the signature verification processing section 511 performs the processes at steps S16101 through S16105 shown in FIG. 11.

The purchaser side apparatus 3 performs the same processes as those at steps S8201 through S8203 shown in FIG. 6.

According to this embodiment, the digital signature verifier side apparatus 5 acquires a digital signature and time data by decrypting the timestamp included in a digital-signature-attached message to be verified, using the public key of the time stamping authority side apparatus 8. By checking whether date and time indicated by this time data is later than disclosure date and time given by a digital signature generator, it is possible to check the validity of the digital signature before verifying the digital signature.

In the above embodiment, the digital signer side apparatus 1 may send a request for issuance of a timestamp at intervals (for example, once every m digital signatures). To verify the validity of a digital-signature-attached message with no timestamp attached thereto, based on disclosure date and time given by a digital signature generator, the following method is used:

After a digital signer side apparatus 1 asks the timestamp issuing apparatus 8 to issue a timestamp by sending a digital signature to the timestamp issuing apparatus 8, the digital signer side apparatus 1 includes the timestamp sent from the timestamp issuing apparatus 8 into a signature log 2235 corresponding to the digital signature to which the timestamp is applied, and registers the signature log 2235 with a signature log table 2234 as shown in FIG. 12. It should be noted that signature logs are registered with the signature log table 2234 in the chronological order.

The digital signature verifier apparatus 5 searches the signature log table 2234 for a signature log which is registered before the signature log corresponding to a digital-signature-attached message to be verified and which includes a timestamp, and decrypts the timestamp to acquire its time data. Since signature logs are registered with the signature log table 2234 in the chronological order, the digital-signature-attached message to be verified was generated after date and time indicated by the decrypted time data. Therefore, if disclosure date and time given by the digital signer is earlier than the date and time indicated by this decrypted time data, the digital-signature-attached message to be verified is determined to be invalid.

Furthermore, in the second embodiment also, a timestamp can be used to determine the validity of a digital signature. Determination of the validity of a digital signature by use of a timestamp can be realized independently from the first embodiment and the second embodiment.

Different from each of the above embodiments, a message itself may be included in each signature log 2235 when the storage device storing the signature log table 2234 has spare capacity.

Different from each of the above embodiments, all processes to be performed by each digital signer side apparatus 1 may be performed inside a computer 21.

Different from each of the above embodiments, various signing methods which use a digital signature, a message (and previous data in the case of the second embodiment), and a public key paired with a secret key owned by a digital signer to authenticate whether said digital signature has been generated for said message, can be applied to the present invention.

As described above, the present invention can provide a digital signature technique which can discriminate a digital signature generated by a digital signature generator from a digital signature generated by a third party posing as the digital signature generator.

The preceding has been a description of the preferred embodiment of the invention. It will be appreciated that deviations and modifications can be made without departing from the scope of the invention, which is defined by the appended claims.

What is claimed is:

1. A digital signing method, comprising:
providing a log list comprising previously generated digital signatures;
computing a computed hash value of inputted data including a message to be signed or a hash value thereof, the inputted data further including only a most recently generated digital signature obtained from the log list or a hash value thereof;
encoding the computed hash value of the inputted data to produce encoded data of a predetermined format that is suitable for encryption processing for generating a digital signature;
applying a secret key to the encoded data to generate a digital signature;

distributing a signature-attached message including the generated digital signature, the message to be signed, and the most recently generated digital signature obtained from the log list or the hash value thereof; and registering the generated digital signature as log data with the log list.

2. The method of claim 1 wherein said log data further comprises a distribution destination associated therewith.

3. The method of claim 1 further comprising registering the log data with said log list only when the data from a previously signed message is included in the latest log data that is registered with said log list.

4. A computer-readable storage medium having stored thereon computer-executable program to conduct digital signing using a computer, said computer-executable program causing said computer to:

provide a log list comprising previously generated digital signatures;

compute a computed hash value of inputted data including a message to be signed or a hash value thereof, the inputted data further including only a most recently generated digital signature obtained from the log list or a hash value thereof;

encode the computed hash value of the inputted data to produce encoded data of a predetermined format that is suitable for encryption processing for generating a digital signature;

apply a secret key to the encoded data to produce a generated digital signature;

register as log data the generated digital signature in the log list; and distribute a signature-attached data including the generated digital signature, the message to be signed, and the most recently generated digital signature obtained from the log list or the hash value thereof.

5. The computer-readable storage medium of claim 4, wherein said log data further comprises a distribution destination associated therewith.

6. The computer-readable storage medium of claim 4, wherein said computer-executable program further causes said computer to register the log data with said log list only when the data from a previously signed message is included in the latest log data that is registered with said log list.

7. A computer-executable program that executes a digital signing method using a computer, said digital signing method comprising:

providing a log list comprising previously generated digital signatures;

computing a computed hash value of inputted data including a message to be signed or a hash value thereof, the inputted data further including only a most recently generated digital signature obtained from the log list or a hash value thereof;

encoding the computed hash value of the inputted data to produce encoded data of a predetermined format that is suitable for encryption processing for generating a digital signature;

applying a secret key to the encoded data to produce a generated digital signature;

registering as log data the generated digital signature in the log list; and distributing a signature-attached data including the generated digital signature, the message to be signed, and the most recently generated digital signature obtained from the log list or the hash value thereof.

8. The computer-executable program of claim 7, wherein said log data further comprises a distribution destination associated therewith.

9. The computer-executable program of claim 7, wherein said digital signing method further comprises registering the log data with said log list only when the data from a previously signed message is included in the latest log data that is registered with said log list.

* * * * *